(12) United States Patent
Zou et al.

(10) Patent No.: US 12,027,155 B2
(45) Date of Patent: Jul. 2, 2024

(54) AUTOMATICALLY ADDING SOUND EFFECTS INTO AUDIO FILES

(71) Applicant: Microsoft Technology Licensing, LLC, Redmond, WA (US)

(72) Inventors: Chao Zou, Redmond, WA (US); Ruihua Song, Beijing (CN); Wei Liu, Redmond, WA (US); Min Zeng, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 312 days.

(21) Appl. No.: 17/417,614

(22) PCT Filed: Jan. 25, 2019

(86) PCT No.: PCT/CN2019/073230
§ 371 (c)(1),
(2) Date: Jun. 23, 2021

(87) PCT Pub. No.: WO2020/151008
PCT Pub. Date: Jul. 30, 2020

(65) Prior Publication Data
US 2022/0093082 A1     Mar. 24, 2022

(51) Int. Cl.
*G10L 15/02*        (2006.01)
*G10L 15/08*        (2006.01)
*G10L 15/22*        (2006.01)

(52) U.S. Cl.
CPC ............ *G10L 15/08* (2013.01); *G10L 15/02* (2013.01); *G10L 15/22* (2013.01); *G10L 2015/088* (2013.01); *G10L 2015/228* (2013.01)

(58) Field of Classification Search
USPC ................. 704/200, 205, 208, 211, 226, 231
See application file for complete search history.

(56) References Cited

U.S. PATENT DOCUMENTS 6,334,104 B1 * 12/2001  Hirai ...................... G10L 13/047
                                                                463/40
7,644,000 B1 *  1/2010  Strom ..................... G10L 21/00
                                                                704/251

(Continued)

FOREIGN PATENT DOCUMENTS

CN        104778067 A       7/2015
CN        107464555 A      12/2017
(Continued)

OTHER PUBLICATIONS

"First Office Action and Search Report Issued in Chinese Patent Application No. 201980025776.X", dated Jul. 22, 2023, 15 Pages.
(Continued)

*Primary Examiner* — Leonard Saint-Cyr
(74) *Attorney, Agent, or Firm* — Schwegman Lundberg & Woessner, P.A.

(57) ABSTRACT

Disclosed are a method and apparatus for automatically adding sound effects into an audio file. At least one trigger word may be identified from text content corresponding to the audio file (1210). Context information of the at least one trigger word may be determined from the text content (1220). It may be decided, based on the context information of the at least one trigger word, that sound effect addition is applicable the at least one trigger word (1230). A sound effect corresponding to the at least one trigger word may be selected from a sound effect library (1240). The sound effect may be integrated into the audio file (1250).

19 Claims, 8 Drawing Sheets

(56) References Cited

U.S. PATENT DOCUMENTS

| | | |
|---|---|---|
| 8,548,243 B2 | 10/2013 | Tsunokawa et al. |
| 2009/0326948 A1 | 12/2009 | Agarwal et al. |
| 2013/0030814 A1* | 1/2013 | Rajput .................... G10L 15/22 |
| | | 704/E21.001 |
| 2014/0178049 A1 | 6/2014 | Kihara et al. |
| 2017/0352361 A1 | 12/2017 | Thörn |
| 2019/0057688 A1* | 2/2019 | Black ...................... G06F 3/167 |

FOREIGN PATENT DOCUMENTS

| | | |
|---|---|---|
| CN | 108242238 A | 7/2018 |
| CN | 109065018 A | 12/2018 |
| WO | 2016173395 A1 | 11/2016 |
| WO | 2017215653 A1 | 12/2017 |
| WO | 2018111384 A1 | 6/2018 |

OTHER PUBLICATIONS

"Search Report Issued in European Patent Application No. 19911862. 1", dated Jul. 29, 2022, 9 Pages.

"International Search Report and Written Opinion Issued in PCT Patent Application No. PCT/CN19/073230", dated Oct. 23, 2019, 10 Pages.

Office Action Received for Chinese Application No. 201980025776. X, dated Feb. 4, 2024, 14 pages (English Translation Provided).

Decision of Rejection Received for Chinese Application No. 201980025776, mailed on Apr. 30, 2024, 16 pages (English Translation Provided).

\* cited by examiner

AUTOMATICALLY ADDING SOUND EFFECTS INTO AUDIO FILES

CROSS-REFERENCE TO RELATED APPLICATION

This application is a U.S. National Stage Filing under 35 U.S.C. 371 of International Patent Application Serial No. PCT/CN2019/073230, filed Jan. 25 2019, and published as WO 2020/151008 A1 on Jul. 30, 2020, which application and publication are incorporated herein by reference in their entirety.

BACKGROUND

Audio files are used for representing content in voice or sound. The audio files may be classified into various types in terms of content category, such as, story, novel, joke, lecture, popular science, news reporting, and so on. In some situations, the audio files may not only contain content itself to be represented to listeners, but also contain some sound effects associated with the content. The sound effects may help to create mental images in the mind of the listeners, and increase attention degree of the listeners. For example, for an audio file telling a story, the story may contain some expressions describing or indicating certain sounds. In this case, actual sound effects corresponding to the expressions may be added into the audio file, and this would enhance the atmosphere of the story, help the listeners to reconstruct an imagery of the story, and draw more attention of the listeners.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method and apparatus for automatically adding sound effects into an audio file. At least one trigger word may be identified from text content corresponding to the audio file. Context information of the at least one trigger word may be determined from the text content. It may be decided, based on the context information of the at least one trigger word, whether sound effect addition is applicable for the at least one trigger word. In one case, it may be decided, based on the context information of the at least one trigger word, that the sound effect addition is applicable for the at least one trigger word, and thus a sound effect corresponding to the at least one trigger word may be selected from a sound effect library, and the sound effect may be integrated into the audio file. In another case, it may be decided, based on the context information of the at least one trigger word, that the sound effect addition is inapplicable for the at least one trigger word, and thus any operation about adding a sound effect corresponding to the at least one trigger word into the audio file may be stopped.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
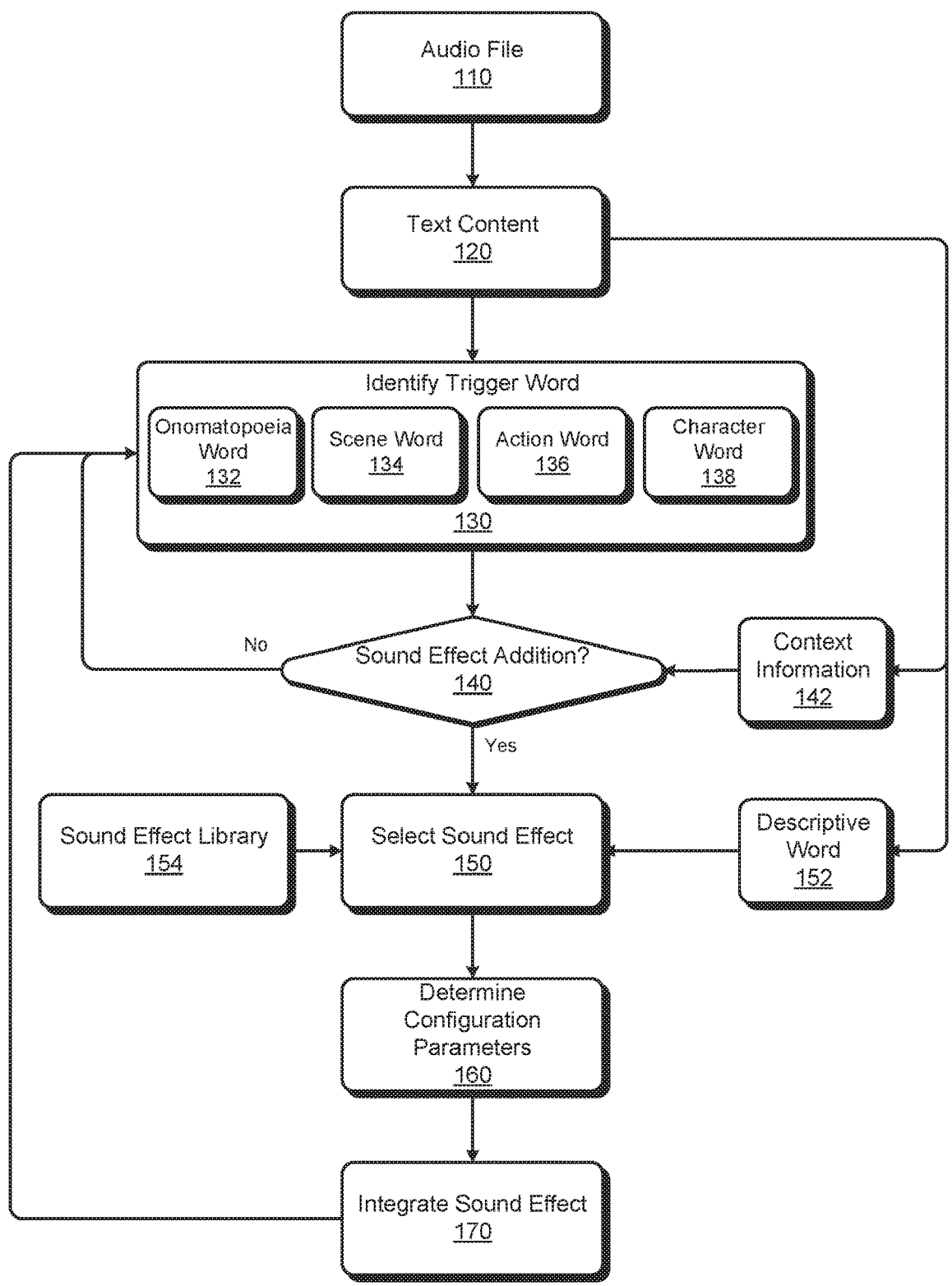
FIG. 1 illustrates an exemplary general process for automatically adding sound effects into an audio file according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, sound effects are manually added into audio files. For example, for a sentence "He just stood up. 'Bang! Bang!' The gun was fired" in an audio file, the words "Bang! Bang!" may be manually identified as describing a certain sound, and then a sound effect imitating such certain sound may be manually selected and integrated into the audio file. Accordingly, when playing this sentence, the added sound effect may also be played. However, this manual sound effect addition approach is labor intensive, time consuming and inefficient, and highly depends on human being's subjective judgments. The produced audio files often have poor quality, which may contain only a few sound effects or inappropriate and imprecise sound effects.

Embodiments of the present disclosure propose a method and apparatus for automatically adding sound effects into audio files. The embodiments of the present disclosure are not limited to identify trigger words describing or indicating sound from an audio file on a word-level, but can further decide whether sound effects should be added for the trigger words and select precise sound effects on a sentence-level. Herein, "trigger words" may refer to words related to sound in text content corresponding to an audio file, which may potentially trigger an operation of adding sound effects corresponding to the trigger words into the audio file.

Although a trigger word itself may describe or indicate sound, more sentence-level information may be obtained from text content corresponding to an audio file, for facilitating to improve appropriation and precision of sound effect addition.

Instead of simply adding a sound effect for each identified trigger word, the embodiments of the present disclosure may decide whether a sound effect should be added for this trigger word based on sentence-level information in the text content, e.g., context information of the trigger word. Herein, "context information" may refer to semantic information associated with the trigger word, which is extracted or derived from a sentence containing the trigger word in the text content through semantically understanding the sentence, etc. The context information may help to appropriately determine whether the trigger word in the sentence indeed indicates a sound effect or not.

Moreover, when selecting a sound effect for the trigger word, the embodiments of the present disclosure may also consider sentence-level information in the text content corresponding to the audio file, e.g., descriptive words associated with the trigger word. Herein, "descriptive words" may refer to words in the sentence containing the trigger word in the text content, which may provide descriptive information about the sound indicated by the trigger word. The descriptive words may help to precisely select a sound effect for the trigger word.

Furthermore, even in the process of determining configuration parameters for integrating the sound effect into the audio file, the embodiments of the present invention may also consider sentence-level information in the text content corresponding to the audio file, e.g., definitive words associated with the trigger word, etc. Herein, "configuration parameters" may refer to various parameters indicating how to integrate the sound effect into the audio file, and "definitive words" may refer to words defining attributes of sound indicated by the trigger word.

The embodiments of the present disclosure for automatically adding sound effects into audio files may avoid onerous manual dubbing work, and produce high-quality audio files with rich, appropriate and precise sound effects.

Although the following discussion of the embodiments of the present disclosure is directed to audio files in a story type, it should be understood that the innovative concepts of the present disclosure may be applied to any other types of audio file in a similar manner.

FIG. 1 illustrates an exemplary general process 100 for automatically adding sound effects into an audio file according to an embodiment. Various operations involved in the process 100 may be performed automatically, so as to enable automatic sound effect addition to an audio file. The process 100 may be implemented in a separate software or application. For example, the software or application may have a user interface for interacting with a user. The process 100 may be implemented in a hardware device running the software or application. For example, the hardware device may be designed for performing the process 100. The process 100 may also be invoked or implemented as a component in a third party application. As an example, the third party application may be, e.g., an artificial intelligence (AI) chatbot, wherein the process 100 may enable the chatbot to have the ability to automatically add sound effects into an audio file.

At 110, an audio file into which sound effects are to be added may be obtained. For example, the audio file may be an audio book about children's story, ghost story, etc.

At 120, text content corresponding to the audio file may be obtained. The text content may be obtained through various approaches. In an implementation, the text content may be received along with the audio file. In an implementation, the text content may be generated through processing the audio file, e.g., performing Speech Recognition (SR) or Speech to Text (STT) Conversion to the audio file.

At 130, at least one trigger word may be identified from the text content. The trigger word may describe or indicate a certain sound, and may potentially trigger to add sound effects into the audio file.

According to sound categories, trigger words may be divided into various types. As an example, the trigger word may be an onomatopoeia word 132. Herein, "onomatopoeia word" may refer to a word used for imitating sound, e.g., "bang", "boom", "meow", etc. As another example, the trigger word may be a scene word 134. Herein, "scene word" may refer to a word describing a scene in the text content and indicating a scene sound produced by the surroundings in the text content, e.g., "river", "farm", "forest", "sea", etc. As yet another example, the trigger word may be an action word 136. Herein, "action word" may refer to a word describing an action by a character which potentially causes an action sound, e.g., "close", "break", "fall", "sneeze", "chew", etc. As still yet another example, the trigger word may be a character word 138. Herein, "character word" may refer to a word describing a character who may have a personalized character sound, e.g., "monster", "stove", "dog", "cat", etc.

The trigger word may be identified from the text content through various approaches. In an implementation, the trigger word may be identified from the text content based on part-of-speech of the trigger word. Usually, part-of-speech of a word in the text content may indicate whether this word is a trigger word and further indicate a type of this trigger word. For example, if part-of-speech of a word is onomatopoeia, this word may be a trigger word in a type of "onomatopoeia word". If part-of-speech of a word is verb, this word may be a trigger word in a type of "action word". If part-of-speech of a word is noun, this word may be a trigger word in a type of "scene word" or "character word". As an example, for a sentence "A group of ducks is screaming with 'quack quack'" in the text content, part-of-speech of the words "quack quack" may be tagged as onomatopoeia, and thus the words "quack quack" may be identified as trigger words.

In an implementation, the trigger word may be identified from the text content through matching with a predetermined trigger word list. The predetermined trigger word list may comprise a plurality of candidate trigger words that are previously collected and empirically determined as potentially triggering sound effect addition. Accordingly, if a word in the text content is found as matching with a candidate trigger word in the predetermined trigger word list, this word in the text content may be identified as a trigger word. For example, for a sentence "They arrived at a farm" in the text content, if the word "farm" matches with a candidate trigger word in the predetermined trigger word list, the word "farm" in the text content may be identified as a trigger word. The predetermined trigger word list may be established through various approaches. Taking trigger words in the type of scene word as an example, a group of basic scene words which may cover a large ratio of scene sound effects is firstly defined, e.g., "forest", "mountain", "river", "sea", "rain", "wind", "thunder", "park", "party", "farm", "plaza", "prairie", "restaurant", "pool", "school", "campfire", etc. Then, synonyms of these basic scene words may be collected, for example, synonyms of the basic scene word "forest" may comprise "jungle", "timber", "woodland", etc. The basis scene words and/or their synonyms may be added to the predetermined trigger word list as candidate trigger words. In the similar way, other types of candidate trigger words may also be added into the predetermined trigger word list.

It should be appreciated that the identifying of trigger word at 130 may optionally consider any other criteria. In an implementation, the at least one trigger word may be identified only from aside parts in the text content rather than from conversations in the text content, because all the words in a conversation are spoken out by a character and it would be undesirable to add sound effects for these words in the conversation. In an implementation, it may be avoided that the trigger word is identified from a character's name. In an implementation, those words with part-of-speech of modal particle shall not be identified as trigger words, e.g., "Um", "Wow", etc. In an implementation, the identifying of trigger word may further comprise combination of trigger words or border redefinition of trigger words. For example, for a sentence "He just stood up. 'Bang! Bang!' The gun was fired", there are two words "Bang" in this sentence, and these two words are identified as one trigger word "Bang! Bang!" through combination or border redefinition, rather than identified as two separate trigger words, and thus the trigger word "Bang! Bang!" would be deemed as a whole during the following processes.

At 140, it is decided, based on sentence-level information, whether sound effect addition is applicable for the at least one trigger word. For example, the deciding may be made based on context information of the trigger word. As discussed above, the context information may be semantic information associated with the trigger word extracted or derived from a sentence containing the trigger word. Accordingly, the process 100 may further comprise determining the context information of the trigger word from the text content at 142. For example, the context information may be determined through semantically understanding the sentence in the text content. In an implementation, the context information may comprise at least one of: part-of-speech of the trigger word, part-of-speech of words adjacent to the trigger word in the text content, subjunctive word associated with the trigger word in the text content, negative word associated with the trigger word in the text content, and dependency relationship of the trigger word in the text content.

If it is decided at 140 that sound effect addition is not applicable, the process 100 may stop any further operation about adding a sound effect corresponding to the at least one trigger word into the audio file, and return to the step 130 to further identify trigger words. Else if it is decided at 140 that sound effect addition is applicable, the process 100 would proceed to step 150.

At 150, a sound effect corresponding to the at least one trigger word may be selected from a sound effect library 154. The sound effect library 154 may comprise a plurality of candidate sound effects and corresponding labeling information. The trigger word may be used as a keyword for searching in the sound effect library 154, so as to find a sound effect corresponding to the trigger word from the sound effect library 154. The establishing of the sound effect library 154 will be discussed below with reference to FIG. 2.

In a further preferred implementation, the selection of sound effect at 150 may be further based on sentence-level information so as to improve precision of the selected sound effect. For example, besides the at least one trigger word, at least one descriptive word associated with the trigger word may also be used for selecting the sound effect. Accordingly, the process 100 may further comprise extracting the descriptive word associated with the trigger word from the text content at 152. As discussed above, the descriptive word may provide descriptive information about the sound indicated by the trigger word. For example, for a sentence "He closed the door heavily" in the text content, the word "close" may be identified as a trigger word, which is an action word, and the word "door" may be extracted as a descriptive word that describes the action "close". The sound effect library 154 may contain various candidate sound effects related to the action "close", e.g., candidate sound effects about "close window", "close door", "close book", etc. However, at least through information provided by the descriptive word "door", the candidate sound effect about "close door" may be precisely selected from the sound effect library 154, thus avoiding selecting any other irrelevant candidate sound effects.

At 160, configuration parameters of the sound effect in the audio file may be determined. The configuration parameters may indicate how to integrate the sound effect into the audio file. For example, the configuration parameters may indicate: at which position the sound effect shall be located in the audio file, playing volume of the sound effect, loop count of the sound effect, fade-in and fade-out setting of the sound effect, etc.

At 170, the sound effect may be integrated into the audio file based on the configuration parameters. Then, the process 100 may return to the step 130 so as to add sound effect for another trigger word.

Through the process 100, the original audio file may be updated to a new audio file with appropriate and precise sound effects. When playing the new audio file to listeners, the added sound effects may also be played for the listeners. This would help the listeners to reconstruct an imagery of the story in the audio file, and draw more attention of the listeners.

Figure 2:
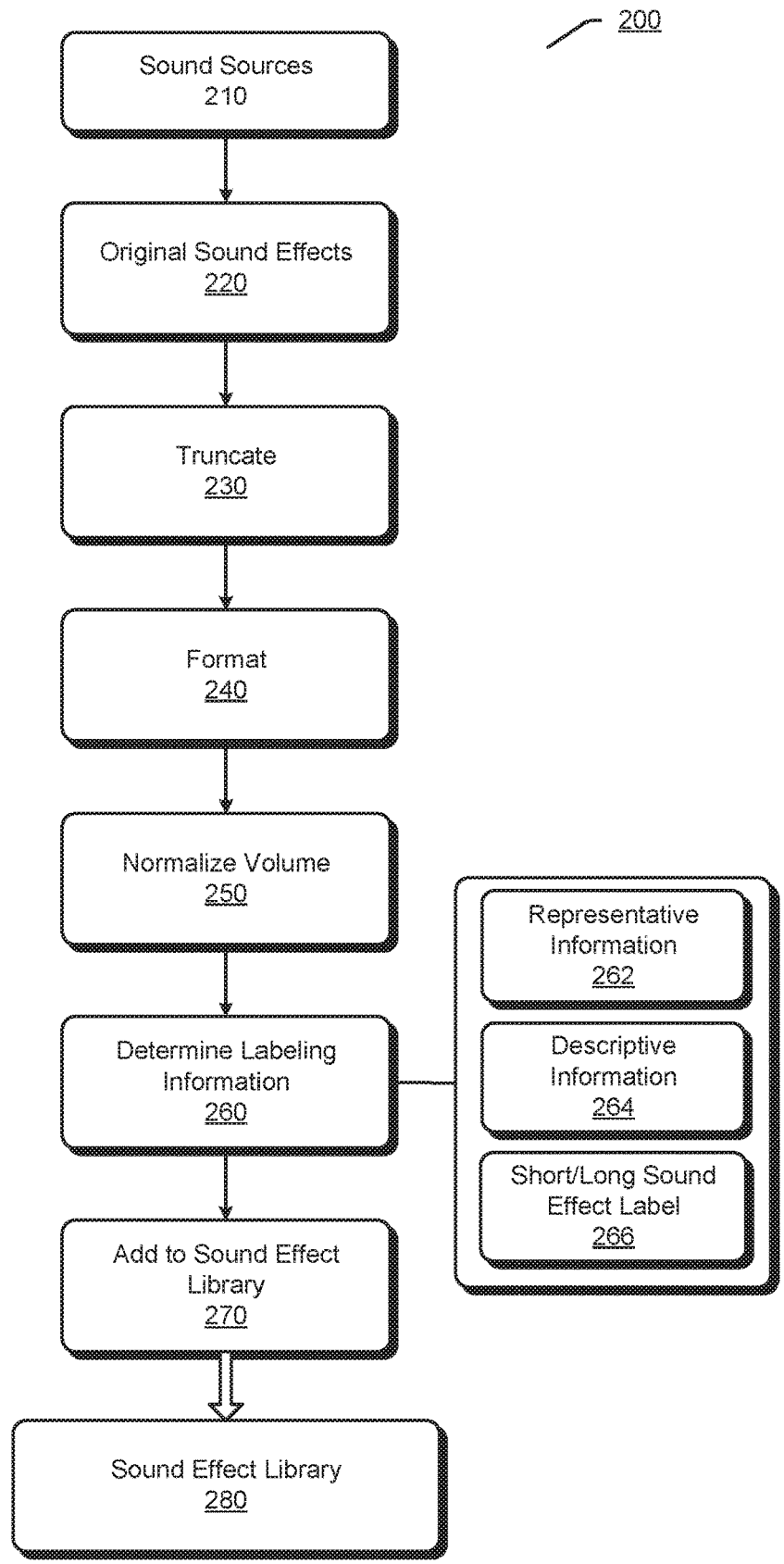
FIG. 2 illustrates an exemplary process for establishing a sound effect library according to an embodiment.

FIG. 2 illustrates an exemplary process 200 for establishing a sound effect library according to an embodiment.

At 210, one or more sound sources may be accessed. The sound sources may be any types of sources from which sound effects can be obtained, e.g., sound effect websites, dubbing websites, movies, short videos, etc.

At 220, a plurality of original sound effects may be obtained from the sound sources. For example, the original sound effects may be downloaded from a sound effect website directly, identified and extracted from movies or short videos, etc. The original sound effects may be further used for producing candidate sound effects to be stored in a sound effect library.

In some cases, an original sound effect may contain more than one sound effect unit. Herein, "sound effect unit" may refer to a minimum segment of sound effect. For example, assuming that a sound effect about sound "knock" is one sound effect unit, an original sound effect about sound "knock knock knock" may be deemed as containing three sound effect units. At 230, the process 200 may truncate each of the original sound effects with more than one sound effect unit into a candidate sound effect having only one sound effect unit. For example, through the truncating at 230, a candidate sound effect about sound "knock" may be obtained from the original sound effect about sound "knock knock knock". Various existing techniques may be adopted for identifying how many sound effect units are contained in an original sound effect and for taking out an audio clip with only one sound effect unit from the original sound effect.

At 240, the candidate sound effects may be formatted into a predetermined format, e.g., ".wav", ".au", ".midi", ".mp3", etc.

At 250, volume of the candidate sound effects may be normalized to a predetermined volume range. For example, the volume of the candidate sound effects may be normalized to the predetermined volume range through the echo gain algorithm.

At 260, labeling information associated with the candidate sound effects may be determined. The labeling information may be various types of information capable of identifying or describing a candidate sound effect, useful for deciding whether to add sound effect, or useful for selecting a sound effect.

In an implementation, the labeling information may comprise representative information 262. The representative information 262 is similar with the "trigger word" as discussed above, which may identify corresponding candidate sound effects. For example, for a candidate sound effect about a body falling into the water, representative information of this candidate sound effect may be an onomatopoeia word imitating the sound caused when an object falls into the water, e.g., "plop". Moreover, the representative information may also be scene words, action words, character words, etc.

In an implementation, the labeling information may comprise descriptive information 264. The descriptive information 264 may be expressions describing corresponding candidate sound effects. Taking the above candidate sound effect about a body falling into the water as an example, the descriptive information of this candidate sound effect may be "dive" or "jump, river". It should be appreciated that each candidate sound effect may have one or more groups of descriptive information, and each group of descriptive information may contain one or more words/elements. Further to the above example, the candidate sound effect has two groups of descriptive information, the first group of descriptive information "dive" containing one word/element, while the second group of descriptive information "jump, river" containing two words/elements.

In an implementation, the labeling information may comprise short or long sound effect label 266 which indicates whether a candidate sound effect is a short sound effect or a long sound effect. Herein, "short sound effect" may refer to a sound effect with relative short duration, e.g., 1 second, and "long sound effect" may refer to a sound effect with relative long duration, e.g., several seconds or even longer. Usually, a scene sound may be a long sound effect, an action sound or a character sound may be a short sound effect, and an onomatopoeia sound may be a short sound effect or a long sound effect.

At 270, the candidate sound effects may be added into a sound effect library 280 together with respective labeling information.

It should be appreciated that all the steps in the process 200 are exemplary, and depending on actual requirements, the orders of these steps may be changed and any of these steps may be omitted.

The embodiments of the present disclosure consider a situation that, depending on sentence-level information, e.g., context information, some trigger words may not indeed indicate sounds, that is, it may be undesired to add sound effects for these trigger words. For example, usually, the scene word "forest" may be related to a scene sound which contains, e.g., voices of birds and insects. However, if the trigger word "forest" is identified from a phase "the king of forest", this trigger word does not relate a scene sound at all, and no sound effect about forest should be added for it. As another example, for a sentence "Little piggy plans to go picnic nearby the river", the trigger word "river" therein is not a scene where the story is happening, because the piggy has not been there yet, and thus it is inappropriate to add a sound effect about water-flowing of a river for this trigger word.

Therefore, after identifying a trigger word from text content corresponding to an audio file, the embodiments of the present disclosure may further determine context information of the trigger word, and decide whether sound effect addition is applicable for the trigger word based on the context information. As discussed above, the context information may comprise various types of sematic information obtained through semantically understanding a sentence containing the trigger word in the text content. The context information may be utilized by various models, e.g., a rule-based classification model, a feature-based classification model, etc., for deciding whether sound effect addition is applicable.

Figure 3:
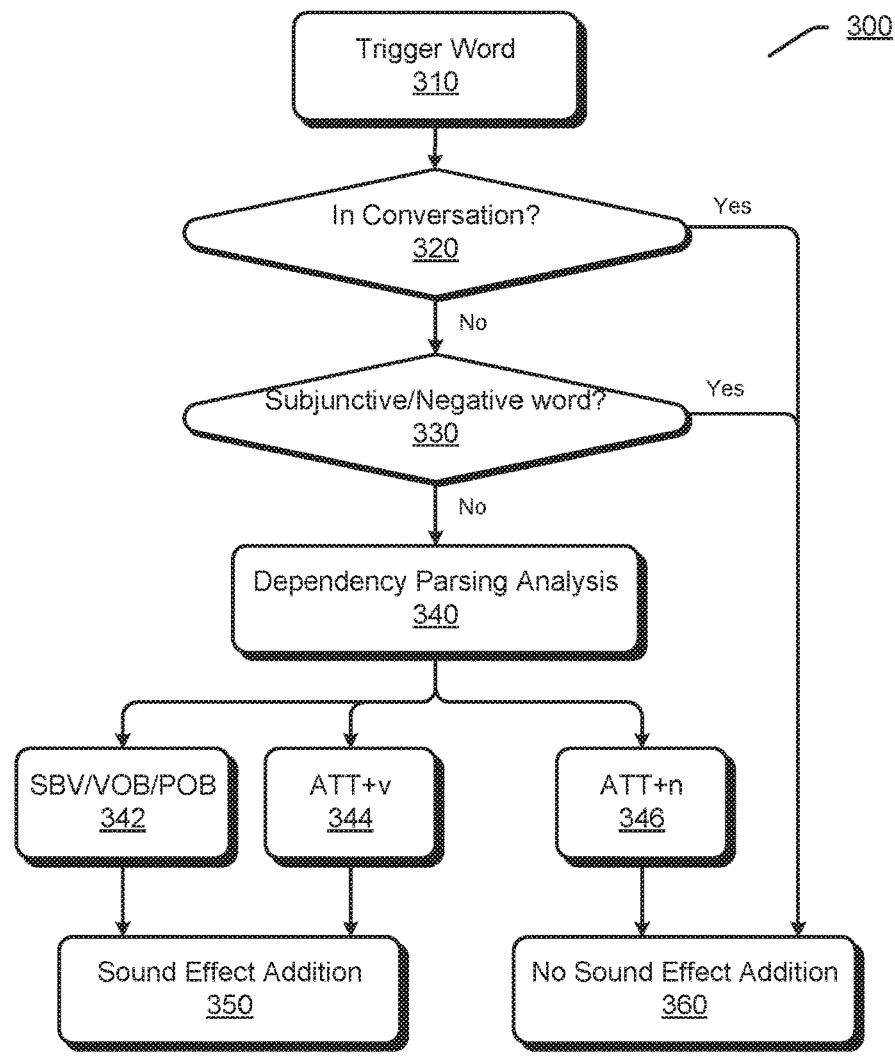
FIG. 3 illustrates an exemplary process for deciding whether sound effect addition is applicable for a trigger word through a rule-based classification model according to an embodiment.

FIG. 3 illustrates an exemplary process 300 for deciding whether sound effect addition is applicable for a trigger word through a rule-based classification model according to an embodiment. The rule-based classification model may adopt a plurality of evident and fundamental rules designed based on various types of context information, for classifying a trigger word into being applicable by sound effect addition or inapplicable by sound effect addition. The process 300 shows an exemplary working flow of several exemplary rules.

At 310, a trigger word may be obtained and input to the rule-based classification model, wherein the trigger word may have been identified from text content of an audio file according to, e.g., the identifying step 130 in FIG. 1.

At 320, the rule-based classification model may determine whether the trigger word is in a conversation, i.e., whether the trigger word is spoken out by a character. If the trigger word is in a conversation, it may be decided at 360 that sound effect addition is not applicable for the trigger word. This is because what is expressed by the trigger word in the conversation may not actually happen or may not happen at the same moment as the conversation. For example, for a sentence "The monkey said nervously: 'There is a monster in my bedroom . . . '" in the text content, although the word "monster" may be identified as a trigger word, e.g., a character word, sound effect addition is not applicable for this trigger word since it is in a conversation. While if it is determined at 320 that the trigger word is not in a conversation, the process 300 may proceed to step 330.

At 330, the rule-based classification model may determine whether the text content contains any special word associated with the trigger word and useful for determining whether sound effect addition is applicable, e.g., subjunctive word, negative word, etc. Herein, "subjunctive word" refers to word expressing various states of unreality, e.g., wish, emotion, possibility, judgment, opinion, obligation, action, etc. that have not occurred yet. For example, the subjunctive word may comprise "want", "would like", "plan", etc. Moreover, "negative word" refers to word implying a negative attitude, e.g., "not", "never", "unable", "failed" etc.

If the sentence containing the trigger word or related to the trigger word in the text content comprises a certain number of subjunctive words and/or negative words associated with the trigger word, it may be decided at 360 that sound effect addition is not applicable for the trigger word. For example, for a sentence "Mr. Rabbit wants to go to the sea" in the text content, although the word "sea" may be identified as a trigger word, e.g., a scene word, sound effect addition is not applicable for this trigger word since there is a subjunctive word "want" associated with this trigger word in the text content which indicates that the event "go to the sea" has not happened yet. Moreover, for example, for a sentence "Jimmy could not close the door" in the text content, although the word "close" may be identified as a trigger word, e.g., an action word, sound effect addition is not applicable for this trigger word since there is a negative word "not" associated with this trigger word in the text content which indicates that the event "close the door" did not happen. While if it is determined at 330 that there is no subjective word and/or negative word associated with the trigger word or no certain number of subjunctive words and/or negative words in the text content, the process 300 may proceed to step 340.

At 340, dependency parsing analysis may be performed on the sentence containing the trigger word. Through the dependence parsing analysis, various types of dependency relationship of the trigger word in the text content may be obtained. The rule-based classification model may compare the various types of dependency relationship of the trigger word with predetermined criteria for deciding whether sound effect addition is applicable.

In an implementation, as shown by block 342, the dependency relationship of the trigger word may comprise anyone of subject-verb (SBV), verb-object (VOB), and preposition-object (POB). Assuming that a criterion indicates that if a trigger word has a dependency relationship of SBV, VOB or POB, e.g., this word is subject or object, it is very likely that this trigger word indicates a sound. Accordingly, if the trigger word meets this criterion, it may be decided at 350 that sound effect addition is applicable for this trigger word. For example, for a sentence "They arrived at a farm", the trigger word "farm" may be determined as having a dependency relationship of POB, e.g., "farm" is object, and thus sound effect addition is applicable for this trigger word.

In an implementation, as shown by block 344, the dependency relationship of the trigger word may comprise attribute to a verb (ATT+v). Assuming that a criterion indicates that if a trigger word has a dependency relationship of ATT+v, it is very likely that this trigger word indicates a sound. Accordingly, if the trigger word meets this criterion, it may be decided at 350 that sound effect addition is applicable for this trigger word. For example, for a sentence "The little tiger jumped with a plop into the river", the trigger word "plop" may be determined as an attribute to the verb "jump", and thus sound effect addition is applicable for this trigger word.

In an implementation, as shown by block 346, the dependency relationship of the trigger word may comprise attribute to a noun (ATT+n). Assuming that a criterion indicates that if a trigger word has a dependency relationship of ATT+n, it is very likely that this trigger word does not indicate a sound. Accordingly, if the trigger word meets this criterion, it may be decided at 350 that sound effect addition is not applicable for this trigger word. For example, for a sentence "Woodpecker is a famous forest doctor", the trigger word "forest" may be determined as an attribute to the noun "doctor", and thus sound effect addition is not applicable for this trigger word.

The types of dependency relationship discussed above are only examples, and any other types of dependency relationship and corresponding criteria may be used for deciding whether sound effect addition is applicable.

It should be appreciated that the process 300 merely shows several exemplary rules 320, 330, 340, 342, 344 and 346 derived from context information. Depending on actual requirements, the orders of these rules may be changed, any of the rules may be omitted, and the rule-based classification model may also adopt any other rules based on context information for making the decision.

Figure 4:
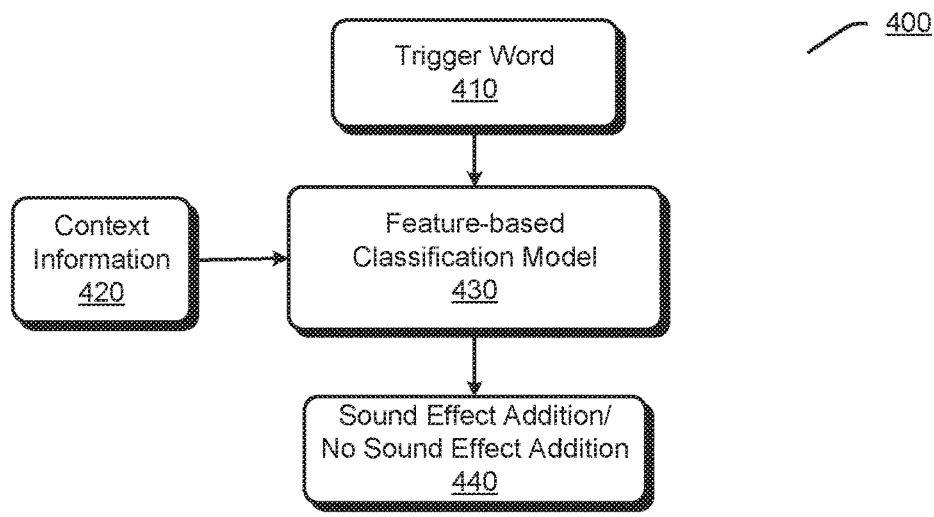
FIG. 4 illustrates an exemplary process for deciding whether sound effect addition is applicable for a trigger word through a feature-based classification model according to an embodiment.

FIG. 4 illustrates an exemplary process 400 for deciding whether sound effect addition is applicable for a trigger word through a feature-based classification model according to an embodiment. The feature-based classification model may adopt a plurality of features based on various types of context information.

At 410, a trigger word may be obtained and provided to the feature-based classification model as input, wherein the trigger word may have been identified from text content of an audio file according to, e.g., the identifying step 130 in FIG. 1.

At 420, context information of the trigger word may be obtained and provided to the feature-based classification model as another input. The context information may have been determined from the text content according to, e.g., the step 142 in FIG. 1.

At 430, the feature-based classification model may classify the trigger word into being applicable by sound effect addition or inapplicable by sound effect addition based on the context information of the trigger word. For example, the feature-based classification model may extract a set of pre-designed features from the context information and utilize these features to make the decision. The feature-based classification model may automatically learn a combination of most useful features to realize the classification. The feature-based classification model may be established based on various techniques, e.g., Support Vector Machine (SVM), Extreme Gradient Boosting (XGBoost), etc. The features may comprise at least one of: part-of-speech of the trigger word; part-of-speech of words adjacent to the trigger word in the text content, e.g., part-of-speech of a word before the trigger word, part-of-speech of a word after the trigger word, etc.; event indicated by the trigger word in the text content, e.g., thundering, wind blowing, etc.; number of subjunctive words associated with the trigger word in the text content, e.g., the number of words implying subjective situation in the sentence containing the trigger word, etc.; number of negative words associated with the trigger word in the text content, e.g., the number of words implying a negative attitude in the sentence containing the trigger word, etc.;

and dependency relationship of the trigger word in the text content, e.g., whether the trigger word is subject, object, attribute to a noun, etc. At 440, the feature-based classification model may output a classifying result about whether sound effect addition is applicable for the trigger word or not.

Compared with the rule-based classification model, the feature-based classification model is more flexible and adaptive. Although the features need to be designed previously, the feature-based classification model does not require designing any specific rules.

It should be appreciated that all the features adopted by the feature-based classification model discussed above are examples, and depending on actual requirements, any of these features may be omitted, and any other features may be adopted. For example, the feature-based classification model may further adopt a feature indicating the number of performing sound effect addition for the same trigger word in the previous part of the text content. Through this feature, it may be avoided to add sound effects for the same trigger word in the same audio file for too many times.

According to the embodiments of the present disclosure, after deciding that sound effect addition is applicable for a trigger word, a sound effect corresponding to the trigger word may be selected from a sound effect library.

Figure 5:
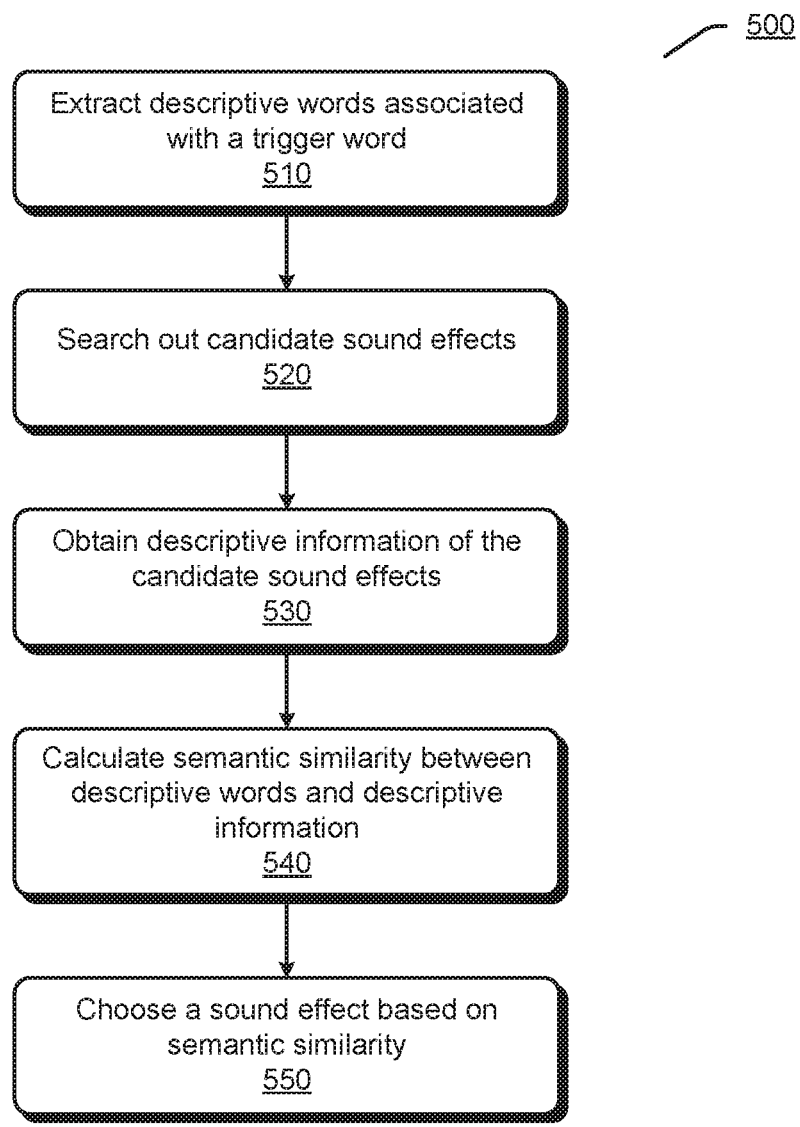
FIG. 5 illustrates an exemplary general process for selecting a sound effect corresponding to a trigger word according to an embodiment.

FIG. 5 illustrates an exemplary general process 500 for selecting a sound effect corresponding to a trigger word according to an embodiment. The process 500 is an exemplary implementation of the step 150 in FIG. 1.

At 510, descriptive words associated with the trigger word may be extracted from text content corresponding to the audio file. As discussed above, the descriptive words are a type of sentence-level information, and may provide descriptive information about the sound indicated by the trigger word. For example, for a sentence "He closed the door heavily" in the text content, the words "door" and "heavily" are descriptive words associated with the trigger action word "close", and may describe that the action sound indicated by the "close" action is about closing a door and should be loudly. For a sentence "He just stood up. 'Bang! Bang!' The gun was fired", the word "gun" is a descriptive word associated with the trigger onomatopoeia word "Bang! Bang!", and may describe that the onomatopoeia sound indicated by the trigger word is about gun's fire. For a sentence "They came to a fast-flowing river", the word "fast-flowing" is a descriptive word associated with the trigger scene word "river", and may describe that the scene sound indicated by the scene word "river" is about fast water-flowing. For a sentence "The noisy dog was walking around the house", the word "noisy" is a descriptive word associated with the trigger character word "dog", and may describe that the character sound indicated by the character word "dog" is about a dog's loudly barking.

The descriptive words associated with the trigger word may be extracted from the text content through various approaches.

In an approach, the descriptive words associated with the trigger word may be extracted through a rule-based extraction model. The rule-based extraction model may adopt a plurality of rules designed based on sentence-level information in the text content, for determining whether a word in the text content is a descriptive word. For example, the rules adopted by the rule-based extraction model may comprise whether the word has a predetermined part-of-speech, e.g., adjective, adverbial, etc. Moreover, the rules adopted by the rule-based extraction model may comprise whether an inverse document frequency (IDF) of the word is above an IDF threshold. The IDF of the word may reflect importance of the word to the text content. Usually, the higher the IDF of the word is, the more likely the word is a descriptive word associated with the trigger word. Furthermore, the rules adopted by the rule-based extraction model may comprise whether a distance between the word and the trigger word is below a distance threshold. Usually, the closer the word is to the trigger word, the more likely the word is a descriptive word associated with the trigger word. It should be appreciated that the rules adopted by the rule-based extraction model may comprise any one or more of the rules discussed above, or comprise any other rules.

In another approach, the descriptive words associated with the trigger word may be extracted through a feature-based extraction model. The feature-based extraction model may adopt a set of features designed based on sentence-level information in the text content, for determining whether a word in the text content is a descriptive word. The feature-based extraction model may be established based on various techniques, e.g., Conditional Random Field (CRF), etc. The features adopted by the feature-based extraction model may comprise at least one of: tri-gram feature of the word, part-of-speech of the word, dependency relationship of the word in the text content, and mutual information between the word and the trigger word. Herein, the mutual information may be a measure of mutual dependence between two words. For example, the mutual information may quantify the "amount of information" obtained about one word through observing the other word. Taking a sentence "A group of ducks is screaming with 'quack quack'" as an example, mutual information between the word "ducks" and the trigger word "quack quack" quantifies the "amount of information" obtained about "ducks" through observing "quack quack". The mutual information between "ducks" and "quack quack" may be relative small, since these two words often appear at the same time in many stories. Therefore, the word "ducks" is very likely to be a descriptive word associated with the trigger word "quack quack".

After extracting the descriptive words, the process 500 may further determine a sound effect corresponding to the trigger word from a sound effect library based on the trigger word and the descriptive words, as discussed below.

At 520, one or more candidate sound effects may be searched out from the sound effect library based on the trigger word. As discussed above, the sound effect library may comprise respective representative information for each candidate sound effect. Accordingly, through matching the trigger word with representative information of candidate sound effects in the sound effect library, those candidate sound effects labeled by representative information matched with the trigger word may be found.

At 530, descriptive information associated with the searched one or more candidate sound effects may be obtained from the sound effect library respectively. As described above, when establishing the sound effect library, each candidate sound effect may also be labeled with descriptive information. Thus, descriptive information associated with each of the one or more candidate sound effects may be obtained along with the candidate sound effect from the sound effect library. It should be appreciated that each candidate sound effect may have one or more groups of descriptive information, and each group of descriptive information may contain one or more words/elements.

At 540, for each of the one or more candidate sound effects, semantic similarity between the descriptive words associated with the trigger word and descriptive information associated with the candidate sound effect may be calculated. In an implementation, the semantic similarity may be calculated as a cosine similarity score in a word vector space. Moreover, if the candidate sound effect has more than one group of descriptive information, then the calculating of semantic similarity should be performed for each group of descriptive information. Accordingly, through the calculating at 540, each of the one or more candidate sound effects may have at least one semantic similarity score. In another implementation, the semantic similarity may also be obtained through looking up a predetermined similarity score table, wherein the predetermined similarity score table may comprise a plurality of word pairs and each word pair is labeled with a respective semantic similarity score.

At 550, a candidate sound effect with the highest semantic similarity may be chosen from the one or more candidate sound effects, and used as a sound effect corresponding to the trigger word.

Figure 6:
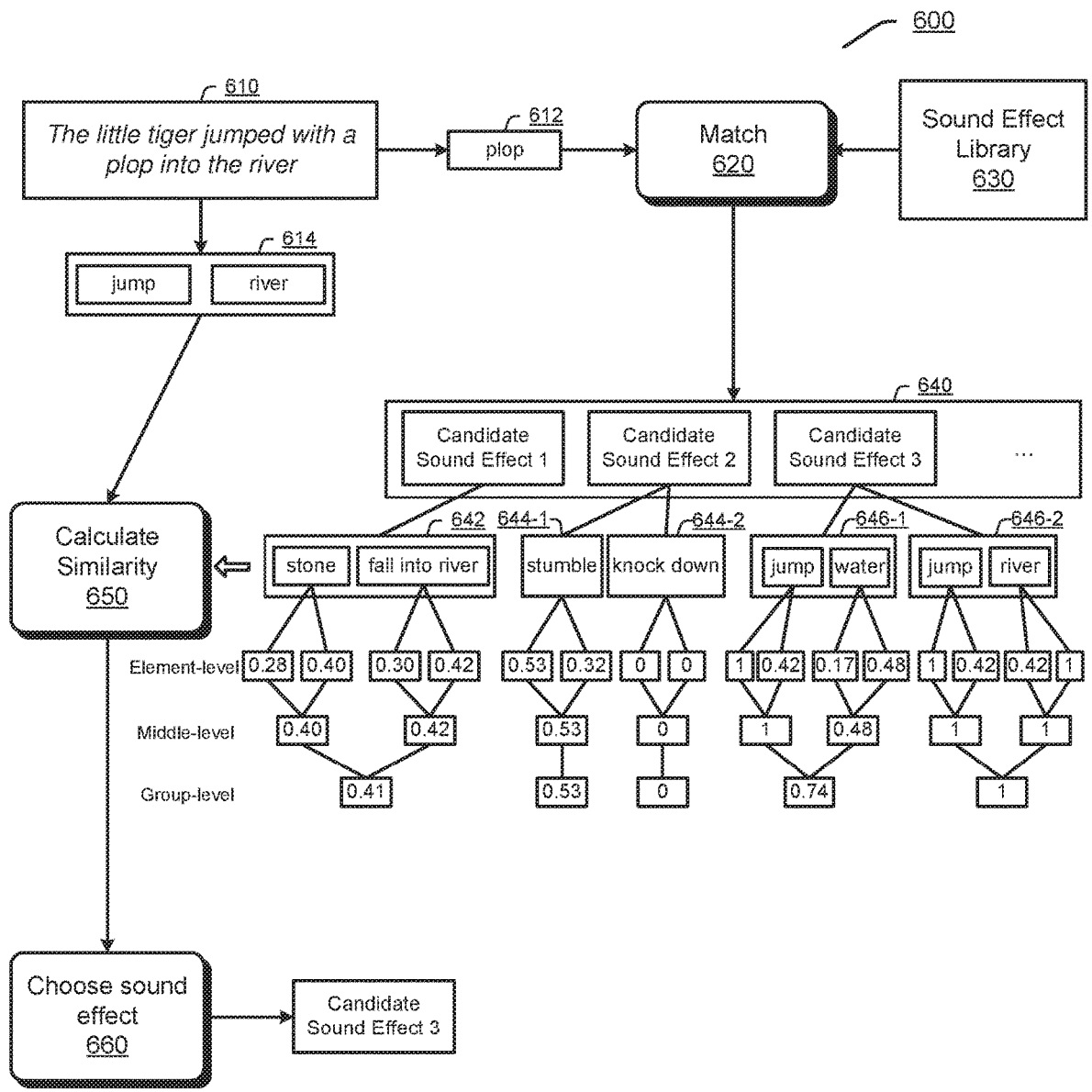
FIG. 6 illustrates a specific example for selecting a sound effect corresponding to a trigger word according to an embodiment.

FIG. 6 illustrates a specific example 600 for selecting a sound effect corresponding to a trigger word according to an embodiment. Although the example 600 relates to a trigger word of an onomatopoeia word type, it should be understood that the process of the example 600 may also be applied to any other types of trigger word in a similar manner.

As for an exemplary sentence 610 "The little tiger jumped with a plop into the river" in text content corresponding to an audio file, a trigger word 612 "plop" may be identified from the sentence 610. Moreover, a group of descriptive words 614, e.g., <jump, river>, associated with the trigger word 612 may also be extracted from the sentence 610.

At 620, the trigger word 612 "plop" may be matched with representative information of candidate sound effects in a sound effect library 630, so as to search out a set of candidate sound effects 640, e.g., candidate sound effect 1, candidate sound effect 2, candidate sound effect 3, etc. Moreover, descriptive information associated with each of the set of candidate sound effects 640 may also be obtained from the sound effect library 630 respectively. For example, a group of descriptive information 642 <stone, fall into river> may be obtained for the candidate sound effect 1, wherein the group of descriptive information 642 comprises two elements, "stone" and "fall into river". A group of descriptive information 644-1 <stumble> and another group of descriptive information 644-2 <knock down> may be obtained for the candidate sound effect 2, wherein the group of descriptive information 644-1 only comprises one element "stumble" and the group of descriptive information 644-2 only comprises one element "knock down". A group of descriptive information 646-1 <jump, water> and another group of descriptive information 646-2 <jump, river> may be obtained for the candidate sound effect 3, wherein the group of descriptive information 646-1 comprises two elements, "jump" and "water", and the group of descriptive information 646-2 comprises two elements, "jump" and "river".

At 650, semantic similarity between the group of descriptive words 614 associated with the trigger word and each group of descriptive information associated with each of the set of candidate sound effects 640 may be calculated respectively. It should be appreciated that the following discussion about the calculating of semantic similarity is exemplary, and any other calculating approaches may also be adopted by the embodiments of the present disclosure.

Firstly, element-level semantic similarity between each descriptive word associated with the trigger word and each element in each group of descriptive information may be calculated respectively. In an implementation, the element-level semantic similarity may be a cosine similarity score in a word vector space. For example, an element-level semantic similarity between the descriptive word "jump" in the group of descriptive words 614 and the element "stone" in the group of descriptive information 642 may be calculated as "0.28", and an element-level semantic similarity between the descriptive word "river" in the group of descriptive words 614 and the element "stone" in the group of descriptive information 642 may be calculated as "0.40".

Secondly, middle-level semantic similarity may be calculated for each element in each group of descriptive information respectively. By way of example, and not limitation, for a certain element in a group of descriptive information, the middle-level semantic similarity of this element may be determined by taking the maximum value of at least one element-level semantic similarity of this element. For example, as for the element "stone" in the group of descriptive information 642, this element has two element-level semantic similarity values, "0.28" and "0.40", and thus the maximum value "0.40" among the element-level semantic similarity values may be determined as a middle-level semantic similarity of the element "stone". In a further implementation, a first threshold may be applied after calculating middle-level semantic similarity for the elements in the groups of descriptive information. Those middle-level semantic similarities blow the first threshold may be filtered out. For example, the first threshold may be set as "0.70".

Thirdly, group-level semantic similarity may be calculated for each group of descriptive information respectively. By way of example, and not limitation, for a certain group of descriptive information, the group-level semantic similarity of this group of descriptive information may be determined by taking an average value of at least one middle-level semantic similarity of this group of descriptive information. For example, as for the group of descriptive information 642, it has two middle-level semantic similarity values, "0.40" for the element "stone" and "0.42" for the element "fall into river", and thus an average value "0.41" between the two middle-level semantic similarity values may be calculated as the group-level semantic similarity of this group of descriptive information 642. The group-level semantic similarity may be used as a final semantic similarity between the group of descriptive words 614 and this group of descriptive information 642. It should be appreciated that, since the candidate sound effects 2 and 3 have two groups of descriptive information respectively, there are two group-level semantic similarity values for each of them. For example, the candidate sound effect 2 has two group-level semantic similarities "0.53" and "0", and the candidate sound effect 3 has two group-level semantic similarities "0.74" and "1". In a further implementation, a second threshold may be applied after calculating group-level semantic similarity for the groups of descriptive information. Those group-level semantic similarities blow the second threshold may be filtered out. For example, the second threshold may be set as "0.75".

It should be appreciated that the applying of the first threshold and/or the second threshold may facilitate to prevent those candidate sound effects without enough similarity with the group of descriptive words 614 from being chosen in the following processes.

At 660, the candidate sound effect with the highest semantic similarity may be chosen from the set of candidate sound effects 640. For example, in the example 600, the candidate sound effect 3 has the highest semantic similarity of "1", and thus is chosen as a sound effect corresponding to the trigger word 612 "plop".

The exemplary general process for selecting a sound effect corresponding to a trigger word has been discussed above with reference to FIG. 5 and FIG. 6. However, it should be appreciated that depending on actual requirements, any variants may be made to the process.

In an implementation, in the case that the trigger word is an onomatopoeia word, the step of searching out the one or more candidate sound effects from the sound effect library may further comprise: transforming the onomatopoeia word into a phonetic representation; and searching in the sound effect library based on the phonetic representation to obtain the one or more candidate sound effects. For some languages, e.g., Chinese, the same sound effect may be indicated by different onomatopoeia words with the same phonetic representation. In this case, in order to find more candidate sound effects for a trigger onomatopoeia word, instead of literally matching the trigger onomatopoeia word with representative information of candidate sound effects in the sound effect library, the searching of the one or more candidate sound effects may be based on matching between a phonetic representation of the trigger onomatopoeia word and a phonetic representation of representative information in the sound effect library. Accordingly, when establishing the sound effect library, a candidate sound effect may also be labeled by a phonetic representation of respective representative information.

In an implementation, in the case that the trigger word is an onomatopoeia word, the process for selecting the sound effect corresponding to the trigger word may further comprise filtering the searched one or more candidate sound effects. For example, the process may comprise: determining a loop count of sound effect unit indicated by the onomatopoeia word; and filtering out at least one unusable candidate sound effect from the one or more candidate sound effects. The at least one unusable candidate sound effect has a loop count of sound effect unit that cannot match with the loop count of sound effect unit indicated by the onomatopoeia word. For example, for a sentence "The Wolf Grandma came to the door. 'Knock knock knock!'". The onomatopoeia word "knock knock knock" is identified as trigger word, and the loop count of sound effect unit indicated by the onomatopoeia word is "3", i.e., the onomatopoeia word containing three sound effect units "knock". Assuming that a candidate sound effect, e.g., "knock knock", is searched out from the sound effect library which has a loop count of sound effect unit "2", then this candidate sound effect will be filtered out since it cannot match with the loop count "3" indicated by the onomatopoeia word no matter how many times it is repeated.

In an implementation, the searched one or more candidate sound effects may also be filtered based on short or long sound effect labels of the candidate sound effects. If a short or long sound effect label of a searched candidate sound effect does not match with the type of the trigger word, this candidate sound effect may be filtered out. For example, assuming that the trigger word is an action word and a trigger action word always corresponds to a short sound effect, if a searched candidate sound effect is labeled as a long sound effect, then this candidate sound effect may be filtered out.

Figure 7:
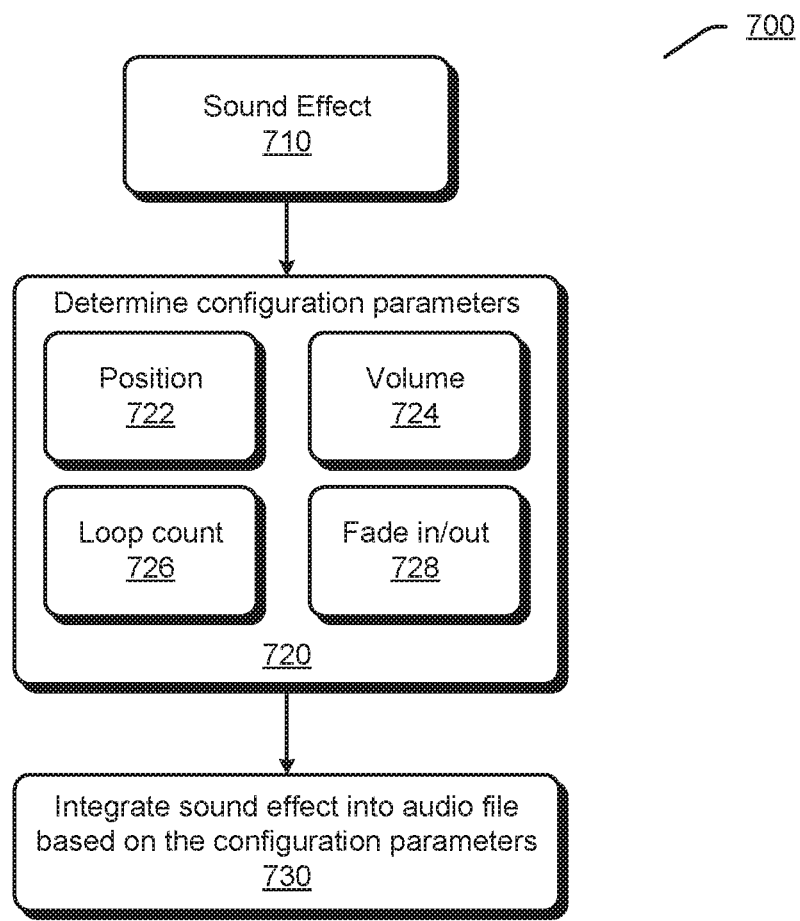
FIG. 7 illustrates an exemplary process for integrating a sound effect into an audio file according to an embodiment.

FIG. 7 illustrates an exemplary process 700 for integrating a sound effect into an audio file according to an embodiment. The process 700 is an exemplary implementation of the steps 160 and 170 in FIG. 1. At 710, a sound effect corresponding to a trigger word may be obtained. For example, the sound effect may have been selected from a sound effect library according to the process 500 in FIG. 5.

At 720, configuration parameters of the sound effect in the audio file may be determined. The configuration parameters may indicate how to integrate the sound effect into the audio file. Generally, an audio file may comprise a text content stream and a sound effect stream, wherein the text content stream plays audio of the text content corresponding to the audio file, and the sound effect stream plays audio of sound effects. Accordingly, the configuration parameters actually indicate how to integrate the sound effect into the sound effect stream of the audio file. The configuration parameters may comprise at least one of: position 722, volume 724, loop count 726, fade-in and fade-out setting 728, etc.

The position 722 indicates at which position the sound effect should be located in the sound effect stream of the audio file, wherein the position in the sound effect stream actually corresponds to a time period to be played in the sound effect stream. For example, the position 722 of the sound effect in the sound effect stream may comprise before, during, after, or partially overlaid with a position of the trigger word in the text content stream. In an implementation, the position 722 may be set empirically. In a further implementation, the position 722 may be determined according to the type of the trigger word and/or whether the sound effect is a short or long sound effect. For example, if the sound effect corresponds to a trigger onomatopoeia word, the sound effect may be integrated during or after the position of the trigger onomatopoeia word. If the sound effect is a long sound effect, the sound effect may be integrated with beginning before the position of the trigger word. If the sound effect is a long sound effect and the trigger word is a scene word, the sound effect may be integrated as covering the position of the trigger scene word.

Moreover, in an implementation, if the trigger word itself forms a sentence, that is, the sentence only contains the trigger word, the sound effect may be integrated during the position of the trigger word, and meanwhile the trigger word may be deleted from the text content stream, such that the trigger word would not be played and listeners would only listen the played sound effect during this time period.

The volume 724 indicates at what volume the sound effect would be played. In an implementation, the volume 724 may be set empirically. For example, a volume of a sound effect about thunder is usually higher than a volume of a sound effect about cricket chirping. In a further implementation, the volume 724 may be determined based on sentence-level information obtained through semantically understanding the text content, e.g., definitive words associated with the trigger word in the text content. The definitive words may define or describe attributes of sound indicated by the trigger word. As an example, for a sentence "He closed the door heavily" in the text content, the word "close" is identified as a trigger word, and the word "heavily" may be identified as a definitive word for the trigger word which indicates that the sound of the "close" action should be loud, and thus the volume of the sound effect corresponding to the trigger word "close" may be set relative loud.

The loop count 726 indicates how many times the sound effect should be repeated. In an implementation, the loop count 726 may be set such that the repeated sound effect can be consistent with the corresponding trigger word. As an example, for a sentence "He just stood up. 'Bang! Bang!' The gun was fired" in the text content, if the sound effect only contains one sound effect unit "Bang", then when integrating this sound effect, it should be repeated twice. In a further implementation, the loop count 726 may be determined based on definitive words associated with the trigger word in the text content. For example, for a sentence "The robber pulled out his gun and fired two shots" in the text content, the word "fire" is identified as a trigger word, and the words "two shots" may be identified as definitive words for the trigger word which indicates that there should be two gunshot sounds. Thus if the sound effect only contains one sound effect unit "Bang", then when integrating this sound effect, it should be repeated twice.

The fade-in and fade-out setting 728 indicates how to apply fade-in and/or fade-out effect for the sound effect. The sound effect may have either or both of a fade-in effect and a fade-out effect. The fade-in and/or fade-out effect may be set in various approaches. For example, if the sound effect has a certain duration, a fade-in effect may be applied for the former half part of the duration, and a fade-out effect may be applied for the latter half part of the duration. For example, it is also possible to set a middle part of the duration of the sound effect as having no any fade-in and fade-out effect. For example, the sound effect may only have a fade-in effect at the beginning part, or may only have a fade-out effect at the ending part. The fade-in and fade-out setting 728 is not limited to the above examples.

At 730, the sound effect may be integrated into the audio file based on the configuration parameters. Accordingly, when playing the audio file to listeners, the integrated sound effect would also be played for the listeners.

It should be appreciated that the process 700 only shows some exemplary configuration parameters, and the embodiments of the present disclosure may adopt any of these configuration parameters or any other configuration parameters.

Next, some exemplary schemes for integrating sound effects into an audio file will be discussed with reference to FIG. 8 to FIG. 11.

Figure 8:
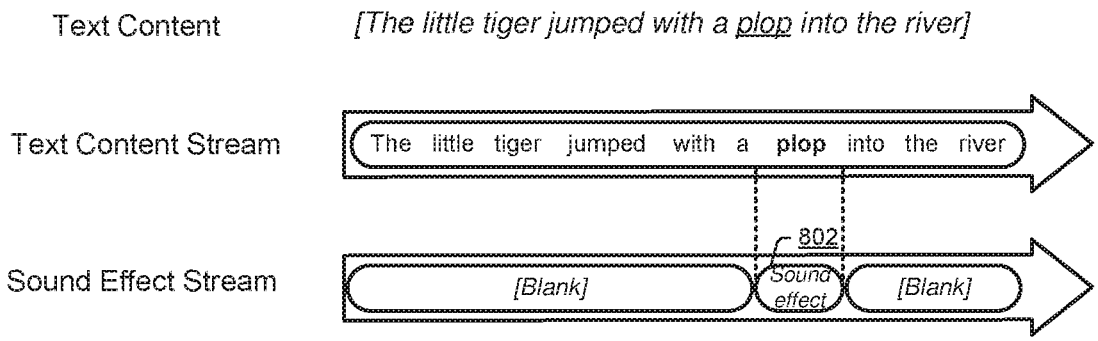
FIG. 8-FIG. 11 illustrate exemplary schemes for integrating sound effects into an audio file according to embodiments.

FIG. 8 illustrates an exemplary part of text content corresponding to an audio file, e.g., "The little tiger jumped with a plop into the river.". Assuming that a trigger word "plop" is identified from the part, and a sound effect 802 corresponding to the trigger word is selected from a sound effect library. As shown in FIG. 8, when integrating the sound effect 802 into the sound effect stream of the audio file, a position of the sound effect 802 in the sound effect stream is set as corresponding to a position of the trigger word "plop" in the text content stream. Thus, when the word "plop" in the text content stream is played, the sound effect 802 in the sound effect stream is also played simultaneously.

Figure 9:
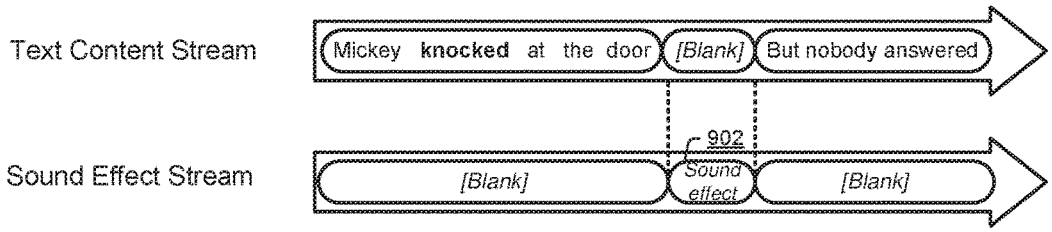

FIG. 9 illustrates an exemplary part of text content corresponding to an audio file, e.g., "Mickey knocked at the door. But nobody answered.". Assuming that a trigger word "knock" is identified from the part, a sound effect 902 corresponding to the trigger word is selected from a sound effect library. As shown in FIG. 9, when integrating the sound effect 902 into the sound effect stream of the audio file, a position of the sound effect 902 in the sound effect stream is set after a position of the trigger word "knock" in the text content stream. Moreover, a blank period may be optionally added in the text content stream, which corresponds to the position of the sound effect 902.

Figure 10:
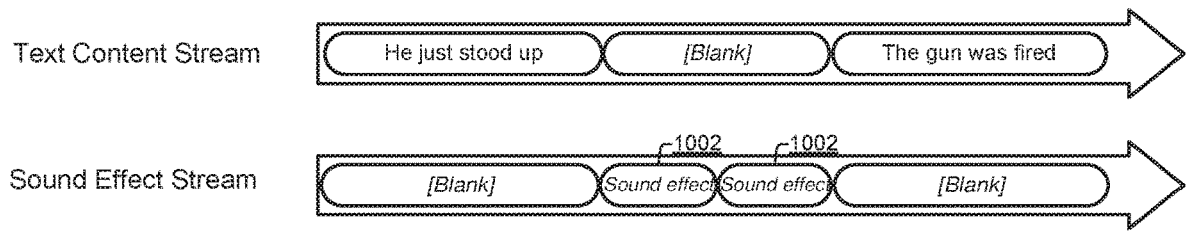

FIG. 10 illustrates an exemplary part of text content corresponding to an audio file, e.g., "He just stood up. 'Bang! Bang!' The gun was fired." Assuming that a trigger word "Bang! Bang!" is identified, which is an onomatopoeia word and has a loop count of "2". A sound effect 1002 with one sound effect unit "Bang!" may be selected from a sound effect library. As shown in FIG. 10, when integrating the sound effect 1002 into the sound effect stream of the audio file, a loop count of the sound effect 1002 is set as "2", e.g., repeated twice, so as to be consistent with the loop count indicated by the trigger word. Position of the sound effect 1002 in the sound effect stream is set as corresponding to a position of the trigger word in the text content stream. Moreover, since the trigger word "Bang! Bang!" itself forms a sentence, the trigger word "Bang! Bang!" is deleted from the text content stream. Thus, the trigger word "Bang! Bang!" will not be played for listeners, instead, the sound effect 1002 will be played for the listeners during this time period.

Figure 11:
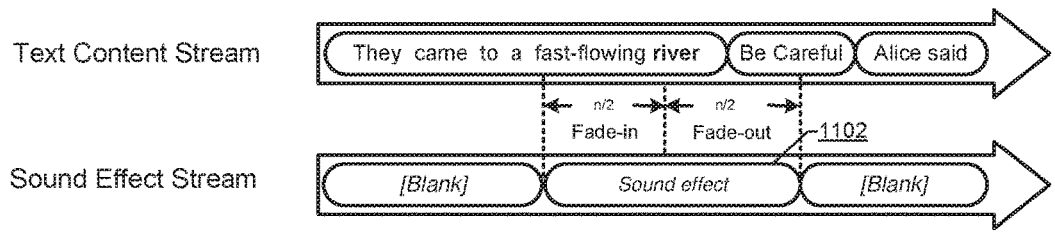

FIG. 11 illustrates an exemplary part of text content corresponding to an audio file, e.g., "They came to a fast-flowing river. 'Be careful!', Alice said.". Assuming that a trigger word "river" is identified from the part, a sound effect 1102 corresponding to the trigger word is selected from a sound effect library. The sound effect 1102 is a long sound effect and its duration is n. As shown in FIG. 11, when integrating the sound effect 1102 into the sound effect stream of the audio file, a position of the sound effect 1102 is set as beginning before and ending after a position of the trigger word "river" in the text content stream. Moreover, a fade-in effect is applied for the first n/2 part of the duration of the sound effect, and a fade-out effect is applied for the second n/2 part of the duration of the sound effect.

It should be appreciated that although the above discussion in connection with FIG. 7 to FIG. 11 propose to integrate a sound effect selected from a sound effect library into an audio file, the embodiments of the present disclosure may also comprise, before the integrating operation, performing a filtering process to a set of sound effects selected from the sound effect library for an audio file. In other words, although sound effect addition may be decided as being applicable for trigger words in text content of the audio file according to the process of FIG. 3 or FIG. 4, sound effects corresponding to these trigger words selected according to the process of FIG. 5 may be further filtered, such that sound effects finally added into the audio file may be more natural and appropriate. The filtering process may be performed through various implementations.

In an implementation, among a set of sound effects corresponding to various trigger words in the text content of the audio file, the filtering process may determine and retain those sound effects with relative high accuracy and quality. For example, the set of sound effects may be ranked based on their semantic similarities calculated according to FIG. 5, and the top-ranked one or more sound effects may be retained. Through the filtering process, only the retained sound effects will be further integrated into the audio file.

In an implementation, the filtering process may be based on density of sound effects to be added in the audio file. Propriety of density of sound effects in the audio file may be evaluated by a density threshold which is based on length of text, e.g., the density threshold may indicate up to five sound effects per thousand words, at least 50 words between two adjacent sound effects, etc. As for each of the set of sound effects, it may be determined whether addition of this sound effect can meet the density threshold. If meets, this sound effect may be further integrated into the audio file, otherwise this sound effect will not be integrated into the audio file. Accordingly, equidistribution of sound effects throughout the audio file may be achieved, thus avoiding sound effects gather at a certain part of the audio file, e.g., the beginning part of the audio file.

In an implementation, the filtering process may be based on priorities for different types of trigger words. For example, considering that it is possible to identify two or more trigger words from the same sentence or adjacent sentences, in order to avoid adding overdose sound effects, different types of trigger words may be specified respective priorities, and among the two or more trigger words, only a sound effect corresponding to a trigger word with the highest priority may be retained and further integrated in the sound effect. For example, it may be specified that a trigger onomatopoeia word has a higher priority than a trigger scene word, and accordingly an onomatopoeia sound effect may be prior to a scene sound effect.

In an implementation, the filtering process may apply specific rules for a certain type of sound effect. For example, an exemplary rule for scene sound effect may comprise: a scene sound effect should be added only at the time the scene is changing as indicated in the text content. In other words, for those adjacent and same trigger scene words, only sound effect corresponding to the first trigger scene word will be added into the audio file. As an example, it is assumed that the text content recites "The little tiger walked to a big forest. There were so many birds singing on the trees in the forest. He continued walking to a river, and drank some water in the river. Then the little tiger went back to the forest". Three trigger scene words of "forest" and two trigger scene words of "river" may be identified from the above exemplary text content. For example, the firstly-appeared "forest" and the secondly-appeared "forest" are two adjacent and same trigger words, and the firstly-appeared "forest" indicates that the scene of the story in the text content changes to forest. Thus, the filtering process will only retain a sound effect corresponding to the firstly-appeared "forest", but does not retain a sound effect for the secondly-appeared "forest". As for the firstly-appeared "river", it indicates that the scene of the story has changed from forest to river, and thus the filtering process retains a sound effect corresponding to the firstly-appeared "river", while since the secondly-appeared "river" is the same as and adjacent to the previous trigger word "river", the filtering process will not retain a sound effect corresponding to the secondly-appeared "river". As for the thirdly-appeared "forest", it indicates that the scene of the story has changed from river to forest again, and thus the filtering process may retain a sound effect corresponding to this thirdly-appeared "forest".

It should be appreciated that although the filtering process is discussed above as being performed after selecting sound effects corresponding to trigger words and before integrating sound effects into an audio file, this filtering process may also be partially performed following the identifying of trigger words from text content of the audio file.

Figure 12:
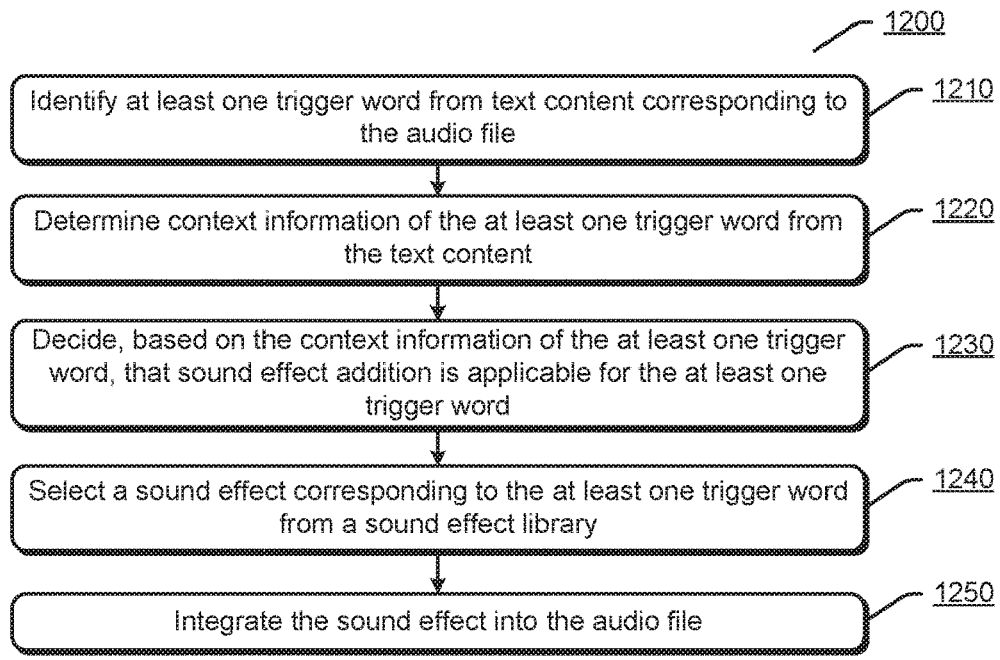
FIG. 12 illustrates a flowchart of an exemplary method for automatically adding sound effects into an audio file according to an embodiment.

FIG. 12 illustrates a flowchart of an exemplary method 1200 for automatically adding sound effects into an audio file according to an embodiment.

At 1210, at least one trigger word may be identified from text content corresponding to the audio file.

At 1220, context information of the at least one trigger word may be determined from the text content.

At 1230, it may be decided, based on the context information of the at least one trigger word, that sound effect addition is applicable for the at least one trigger word.

At 1240, a sound effect corresponding to the at least one trigger word may be selected from a sound effect library.

At 1250, the sound effect may be integrated into the audio file.

In an implementation, the at least one trigger word may comprise at least one of: onomatopoeia word, scene word, action word, and character word.

In an implementation, the identifying the at least one trigger word may comprise at least one of: identifying the at least one trigger word from the text content based on part-of-speech of the at least one trigger word; and identifying the at least one trigger word from the text content through matching with a predetermined trigger word list.

In an implementation, the context information may comprise at least one of: part-of-speech of the at least one trigger word; part-of-speech of words adjacent to the at least one trigger word in the text content; subjunctive word associated with the at least one trigger word in the text content; negative word associated with the at least one trigger word in the text content; and dependency relationship of the at least one trigger word in the text content.

In an implementation, the deciding may be performed through a rule-based classification model, the rule-based classification model being based on at least one of the following rules: whether the at least one trigger word is in a conversation; whether there is any subjunctive word associated with the at least one trigger word in the text content; whether there is any negative word associated with the at least one trigger word in the text content; and whether dependency relationship of the at least one trigger word in the text content meets with predetermined criteria.

In an implementation, the deciding may be performed through a feature-based classification model, the feature-based classification model being based on at least one of the following features: part-of-speech of the at least one trigger word; part-of-speech of words adjacent to the at least one trigger word in the text content; event indicated by the at least one trigger word in the text content; number of subjunctive words associated with the at least one trigger word in the text content; number of negative words associated with the at least one trigger word in the text content; and dependency relationship of the at least one trigger word in the text content.

In an implementation, the selecting may comprise: extracting at least one descriptive word associated with the at least one trigger word from the text content; and determining the sound effect corresponding to the at least one trigger word from the sound effect library based on the at least one trigger word and the at least one descriptive word.

The extracting may be performed through a rule-based extraction model, the rule-based extraction model being configured for determining whether a word in the text content is a descriptive word based on at least one of the following rules: whether the word has a predetermined part-of-speech; whether an IDF of the word is above an IDF threshold; and whether a distance between the word and the at least one trigger word is below a distance threshold.

The extracting may also be performed through a feature-based extraction model, the feature-based extraction model being configured for determining whether a word in the text content is a descriptive word based on at least one of the following features: tri-gram feature of the word; part of speech of the word; dependency relationship of the word in the text content; and mutual information between the word and the at least one trigger word.

The determining the sound effect may comprise: searching in the sound effect library based on the at least one trigger word to obtain one or more candidate sound effects; obtaining descriptive information associated with the one or more candidate sound effects from the sound effect library respectively; calculating semantic similarity between the at least one descriptive word and descriptive information associated with each candidate sound effect, respectively; and choosing a candidate sound effect with the highest semantic similarity from the one or more candidate sound effects as the sound effect corresponding to the at least one trigger word.

In one case, the at least one trigger word may be an onomatopoeia word, and the searching may comprise: transforming the onomatopoeia word into a phonetic representation; and searching in the sound effect library based on the phonetic representation to obtain the one or more candidate sound effects.

In one case, the at least one trigger word may be an onomatopoeia word, and the method may further comprises: determining a loop count of sound effect unit indicated by the onomatopoeia word; and filtering out at least one unusable candidate sound effect from the one or more candidate sound effects, wherein the at least one unusable candidate sound effect has a loop count of sound effect unit that cannot match with the loop count of sound effect unit indicated by the onomatopoeia word.

In an implementation, the integrating may comprise: determining configuration parameters of the sound effect in the audio file, the configuration parameters comprising at least one of: position, volume, loop count, and fade-in and fade-out setting; and integrating the sound effect into the audio file based on the configuration parameters.

In an implementation, the sound effect library may be established through: obtaining a plurality of original sound effects from sound sources; and performing a series of following processes for each of the plurality of original sound effects. The processes may comprise: truncating the original sound effect into a candidate sound effect with one sound effect unit; formatting the candidate sound effect into a predetermined format; normalizing volume of the candidate sound effect; determining labeling information associated with the candidate sound effect, the labeling information comprising at least one of: representative information, descriptive information, short or long sound effect label; and adding the candidate sound effect and the labeling information into the sound effect library.

In other implementations, before integrating the selected sound effect into the audio file, the method may further comprise processing the selected sound effect through a filtering process, as discussed above. If the selected sound effect is retained through the filtering process, this sound effect will be further integrated into the audio file.

It should be appreciated that the method 1200 may further comprise any steps/processes for automatically adding sound effects into an audio file according to the embodiments of the present disclosure as mentioned above.

Figure 13:
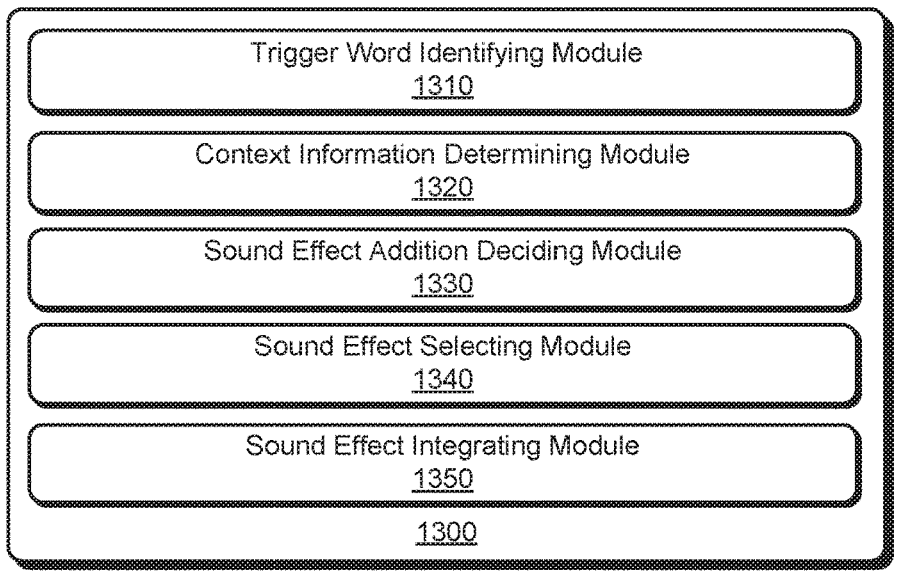
FIG. 13 illustrates an exemplary apparatus for automatically adding sound effects into an audio file according to an embodiment.

FIG. 13 illustrates an exemplary apparatus 1300 for automatically adding sound effects into an audio file according to an embodiment.

The apparatus 1300 may comprise: a trigger word identifying module 1310, for identifying at least one trigger word from text content corresponding to the audio file; a context information determining module 1320, for determining context information of the at least one trigger word from the text content; a sound effect addition deciding module 1330, for deciding, based on the context information of the at least one trigger word, that sound effect addition is applicable for the at least one trigger word; a sound effect selecting module 1340, for selecting a sound effect corresponding to the at least one trigger word from a sound effect library; and a sound effect integrating module 1350, for integrating the sound effect into the audio file.

In an implementation, the at least one trigger word may comprise at least one of: onomatopoeia word, scene word, action word, and character word.

In an implementation, the context information may comprise at least one of: part-of-speech of the at least one trigger word; part-of-speech of words adjacent to the at least one trigger word in the text content; subjunctive word associated with the at least one trigger word in the text content; negative word associated with the at least one trigger word in the text content; and dependency relationship of the at least one trigger word in the text content.

In an implementation, the sound effect addition deciding module 1330 may adopt a rule-based classification model or a feature-based classification model.

In an implementation, the sound effect selecting module 1340 may be further configured for: extracting at least one descriptive word associated with the at least one trigger word from the text content; and determining the sound effect corresponding to the at least one trigger word from the sound effect library based on the at least one trigger word and the at least one descriptive word.

Moreover, the apparatus 1300 may also comprise any other modules configured for automatically adding sound effects into an audio file according to the embodiments of the present disclosure as mentioned above.

Figure 14:
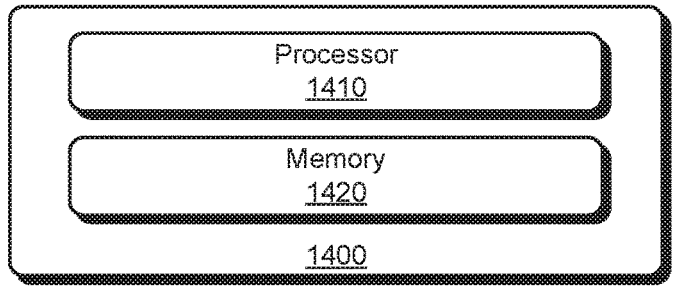
FIG. 14 illustrates an exemplary apparatus for automatically adding sound effects into an audio file according to an embodiment.

FIG. 14 illustrates an exemplary apparatus 1400 for automatically adding sound effects into an audio file according to an embodiment.

The apparatus 1400 may comprise at least one processor 1410 and a memory 1420 storing computer-executable instructions. When executing the computer-executable instructions, the at least one processor 1410 may: identify at least one trigger word from text content corresponding to the audio file; determine context information of the at least one trigger word from the text content; decide, based on the context information of the at least one trigger word, whether sound effect addition is applicable for the at least one trigger word; in response to deciding that the sound effect addition is applicable for the at least one trigger word, select a sound effect corresponding to the at least one trigger word from a sound effect library, and integrate the sound effect into the audio file; and in response to deciding that the sound effect addition is inapplicable for the at least one trigger word, stop adding a sound effect corresponding to the at least one trigger word into the audio file. The at least one processor 1410 may be further configured for performing any operations of the methods for automatically adding sound effects into an audio file according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for automatically adding sound effects into an audio file according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein by reference and are intended to be encompassed by the claims.

What is claimed is:

1. A method for automatically adding sound effects into an audio file, comprising:
   identifying at least one trigger word from text content corresponding to the audio file;
   determining context information of the at least one trigger word from the text content;
   deciding, based on the context information of the at least one trigger word, that sound effect addition is applicable for the at least one trigger word;
   establishing a sound effects library by:
      obtaining a plurality of original sound effects from sound sources; and
      for each of the plurality of original sound effects:
         truncating the original sound effect into a candidate sound effect with one sound effect unit,
         formatting the candidate sound effect into a predetermined format;
         normalizing volume of the candidate sound effect;
         determining labeling information associated with the candidate sound effect, the labeling information comprising at least one of: representative information, descriptive information, short or long sound effect label; and
         adding the candidate sound effect and the labeling information into the sound effect library;
   selecting a sound effect corresponding to the at least one trigger word from the sound effect library; and
   integrating the sound effect into the audio file.

2. The method of claim 1, wherein the at least one trigger word comprises at least one of: onomatopoeia word, scene word, action word, and character word.

3. The method of claim 1, wherein the identifying the at least one trigger word comprises at least one of:
   identifying the at least one trigger word from the text content based on part-of-speech of the at least one trigger word; and
   identifying the at least one trigger word from the text content through matching with a predetermined trigger word list.

4. The method of claim 1, wherein the context information comprises at least one of:
   part-of-speech of the at least one trigger word;
   part-of-speech of words adjacent to the at least one trigger word in the text content;
   subjunctive word associated with the at least one trigger word in the text content;
   negative word associated with the at least one trigger word in the text content; and
   dependency relationship of the at least one trigger word in the text content.

5. The method of claim 1, wherein the deciding is performed through a rule-based classification model, the rule-based classification model being based on at least one of the following rules:
   whether the at least one trigger word is in a conversation;
   whether there is any subjunctive word associated with the at least one trigger word in the text content;
   whether there is any negative word associated with the at least one trigger word in the text content; and
   whether dependency relationship of the at least one trigger word in the text content meets with predetermined criteria.

6. The method of claim 1, wherein the deciding is performed through a feature-based classification model, the feature-based classification model being based on at least one of the following features:
   part-of-speech of the at least one trigger word;
   part-of-speech of words adjacent to the at least one trigger word in the text content;
   event indicated by the at least one trigger word in the text content;
   number of subjunctive words associated with the at least one trigger word in the text content;
   number of negative words associated with the at least one trigger word in the text content; and
   dependency relationship of the at least one trigger word in the text content.

7. The method of claim 1, wherein the selecting comprises:
   extracting at least one descriptive word associated with the at least one trigger word from the text content; and
   determining the sound effect corresponding to the at least one trigger word from the sound effect library based on the at least one trigger word and the at least one descriptive word.

8. The method of claim 7, wherein the extracting is performed through a rule-based extraction model, the rule-based extraction model being configured for determining whether a word in the text content is a descriptive word based on at least one of the following rules:
   whether the word has a predetermined part-of-speech;
   whether an inverse document frequency (IDF) of the word is above an IDF threshold; and
   whether a distance between the word and the at least one trigger word is below a distance threshold.

9. The method of claim 7, wherein the extracting is performed through a feature-based extraction model, the feature-based extraction model being configured for determining whether a word in the text content is a descriptive word based on at least one of the following features:
- tri-gram feature of the word;
- part of speech of the word;
- dependency relationship of the word in the text content; and
- mutual information between the word and the at least one trigger word.

10. The method of claim 7, wherein the determining the sound effect comprises:
- searching in the sound effect library based on the at least one trigger word to obtain one or more candidate sound effects;
- obtaining descriptive information associated with the one or more candidate sound effects from the sound effect library respectively;
- calculating semantic similarity between the at least one descriptive word and descriptive information associated with each candidate sound effect, respectively; and
- choosing a candidate sound effect with a highest semantic similarity from the one or more candidate sound effects as the sound effect corresponding to the at least one trigger word.

11. The method of claim 10, wherein the at least one trigger word is an onomatopoeia word, and the searching comprises:
- transforming the onomatopoeia word into a phonetic representation; and
- searching in the sound effect library based on the phonetic representation to obtain the one or more candidate sound effects.

12. The method of claim 10, wherein the at least one trigger word is an onomatopoeia word, and the method further comprises:
- determining a loop count of sound effect unit indicated by the onomatopoeia word; and
- filtering out at least one unusable candidate sound effect from the one or more candidate sound effects, wherein the at least one unusable candidate sound effect has a loop count of sound effect unit that cannot match with the loop count of sound effect unit indicated by the onomatopoeia word.

13. The method of claim 1, wherein the integrating comprises:
- determining configuration parameters of the sound effect in the audio file, the configuration parameters comprising at least one of: position, volume, loop count, and fade-in and fade-out setting; and
- integrating the sound effect into the audio file based on the configuration parameters.

14. An apparatus for automatically adding sound effects into an audio file, comprising:
- a trigger word identifying module, for identifying at least one trigger word from text content corresponding to the audio file;
- a context information determining module, for determining context information of the at least one trigger word from the text content;
- a sound effect addition deciding module, for deciding, based on the context information of the at least one trigger word, that sound effect addition is applicable for the at least one trigger word;
- a module for establishing a sound effects library by:
  - obtaining a plurality of original sound effects from sound sources; and for each of the plurality of original sound effects:
    - truncating the original sound effect into a candidate sound effect with one sound effect unit;
    - formatting the candidate sound effect into a predetermined format;
    - normalizing volume of the candidate sound effect;
    - determining labeling information associated with the candidate sound effect, the labeling information comprising at least one of: representative information, descriptive information, short or long sound effect label; and
    - adding the candidate sound effect and the labeling information into the sound effect library;
- a sound effect selecting module, for selecting a sound effect corresponding to the at least one trigger word from a sound effect library; and
- a sound effect integrating module, for integrating the sound effect into the audio file;

wherein the different modules are implemented by at least a processor.

15. The apparatus of claim 14, wherein the at least one trigger word comprises at least one of: onomatopoeia word, scene word, action word, and character word.

16. The apparatus of claim 14, wherein the context information comprises at least one of:
- part-of-speech of the at least one trigger word;
- part-of-speech of words adjacent to the at least one trigger word in the text content;
- subjunctive word associated with the at least one trigger word in the text content;
- negative word associated with the at least one trigger word in the text content; and
- dependency relationship of the at least one trigger word in the text content.

17. The apparatus of claim 14, wherein the sound effect addition deciding module adopts a rule-based classification model or a feature-based classification model.

18. The apparatus of claim 14, wherein the sound effect selecting module is further configured for:
- extracting at least one descriptive word associated with the at least one trigger word from the text content; and
- determining the sound effect corresponding to the at least one trigger word from the sound effect library based on the at least one trigger word and the at least one descriptive word.

19. An apparatus for automatically adding sound effects into an audio file, comprising:
- at least one processor; and
- a memory storing computer-executable instructions that, when executed, cause the at least one processor to:
  - identify at least one trigger word from text content corresponding to the audio file,
  - determine context information of the at least one trigger word from the text content,
  - decide, based on the context information of the at least one trigger word, whether sound effect addition is applicable for the at least one trigger word,
  - establish a sound effects library by:
    - obtaining a plurality of original sound effects from sound sources; and
    - for each of the plurality of original sound effects:
      - truncating the original sound effect into a candidate sound effect with one sound effect unit;
      - formatting the candidate sound effect into a predetermined format;
      - normalizing volume of the candidate sound effect;
      - determining labeling information associated with the candidate sound effect, the labeling information comprising at least one of: representative information, descriptive information, short or long sound effect label; and adding the candidate sound effect and the labeling information into the sound effect library, in response to deciding that the sound effect addition is applicable for the at least one trigger word, select a sound effect corresponding to the at least one trigger word from a sound effect library, and integrate the sound effect into the audio file, and in response to deciding that the sound effect addition is inapplicable for the at least one trigger word, stop adding a sound effect corresponding to the at least one trigger word into the audio file.

* * * * *